United States Patent
Zhang

(10) Patent No.: US 10,824,441 B2
(45) Date of Patent: Nov. 3, 2020

(54) APPLICATION PROGRAM MANAGEMENT METHOD FOR MULTIPLE HARDWARE PLATFORMS

(71) Applicant: Zhaoqi Zhang, Hunan (CN)

(72) Inventor: Zhaoqi Zhang, Hunan (CN)

(*) Notice: Subject to any disclaimer, the term of this patent is extended or adjusted under 35 U.S.C. 154(b) by 0 days.

(21) Appl. No.: 15/739,707

(22) PCT Filed: Jun. 29, 2016

(86) PCT No.: PCT/CN2016/087640
§ 371 (c)(1),
(2) Date: Dec. 23, 2017

(87) PCT Pub. No.: WO2017/005126
PCT Pub. Date: Jan. 12, 2017

(65) Prior Publication Data
US 2018/0189082 A1 Jul. 5, 2018

(30) Foreign Application Priority Data

Jul. 6, 2015 (CN) .......................... 2015 1 0389569

(51) Int. Cl.
*G06F 9/44* (2018.01)
*G06F 9/445* (2018.01)
(Continued)

(52) U.S. Cl.
CPC ............ *G06F 9/44536* (2013.01); *G06F 8/47* (2013.01); *G06F 8/61* (2013.01); *G06F 8/64* (2013.01); *G06F 2209/482* (2013.01)

(58) Field of Classification Search
CPC ..................... G06F 8/20–78; G06F 9/44–454
See application file for complete search history.

(56) References Cited

U.S. PATENT DOCUMENTS 5,577,232 A * 11/1996 Priem ...................... G06F 8/71
717/170
6,128,776 A * 10/2000 Kang ....................... G06F 8/64
717/173

(Continued)

FOREIGN PATENT DOCUMENTS

CN          102520948 A      6/2012

*Primary Examiner* — Adam Lee

(57) ABSTRACT

An application program management method for multiple hardware platforms includes steps of: pre-compiling a target application program into versions for supporting different hardware platforms; establishing a mapping relation between hardware platform types and corresponding application program versions, and specifying a generic application program version; when a client computer requires the target application program, requiring a client computer hardware platform type and then searching a mapping relation between the client computer hardware platform type and a corresponding application program version thereof; if found, requiring the corresponding application program version; if not, requiring the generic application program version. With the present invention, the application program can better adapt to a hardware platform of each client computer, the application program runs with a high efficiency, the method is easy to implement, a cost is low, and compatibility with existing operating systems is sufficient.

20 Claims, 2 Drawing Sheets

(51) Int. Cl.
*G06F 8/61* (2018.01)
*G06F 8/41* (2018.01)

(56) References Cited

U.S. PATENT DOCUMENTS

| | | | | |
|---|---|---|---|---|
| 6,263,497 | B1* | 7/2001 | Maeda | G06F 8/64 |
| | | | | 707/999.202 |
| 6,473,897 | B1* | 10/2002 | Ansari | G06F 8/447 |
| | | | | 717/136 |
| 8,380,676 | B1* | 2/2013 | Eastham | G06F 16/125 |
| | | | | 707/662 |
| 9,032,379 | B2* | 5/2015 | Kalogeropulos | G06F 8/443 |
| | | | | 717/152 |
| 2002/0083064 | A1* | 6/2002 | Davis | G06F 16/10 |
| 2003/0066060 | A1* | 4/2003 | Ford | G06F 8/443 |
| | | | | 717/158 |
| 2004/0098383 | A1* | 5/2004 | Tabellion | G06F 16/11 |
| 2006/0136501 | A1* | 6/2006 | Ijeomah | G06F 16/10 |
| 2006/0178848 | A1* | 8/2006 | Ilzuka | G06F 9/5044 |
| | | | | 702/63 |
| 2008/0005111 | A1* | 1/2008 | Savage | G06F 16/1865 |
| 2008/0046442 | A1* | 2/2008 | Grason | G06F 40/14 |
| 2009/0042177 | A1* | 2/2009 | Davis | G09B 3/00 |
| | | | | 434/350 |
| 2009/0144830 | A1* | 6/2009 | Davis | G06F 21/10 |
| | | | | 726/26 |
| 2009/0271602 | A1* | 10/2009 | Burks, III | G06F 11/0748 |
| | | | | 713/2 |
| 2010/0138485 | A1* | 6/2010 | Chow | H04L 67/2842 |
| | | | | 709/203 |
| 2011/0088011 | A1* | 4/2011 | Ouali | G06F 8/10 |
| | | | | 717/105 |
| 2011/0276954 | A1* | 11/2011 | Fontenot | G06F 8/47 |
| | | | | 717/151 |
| 2012/0069371 | A1* | 3/2012 | Fujii | G06F 3/1208 |
| | | | | 358/1.13 |
| 2013/0185705 | A1* | 7/2013 | Kuesel | G06F 8/443 |
| | | | | 717/152 |
| 2013/0339928 | A1* | 12/2013 | Trofin | G06F 9/44521 |
| | | | | 717/122 |
| 2014/0137090 | A1* | 5/2014 | Whitcomb | G06F 8/47 |
| | | | | 717/163 |
| 2014/0173578 | A1* | 6/2014 | Ku | G06F 8/656 |
| | | | | 717/169 |
| 2014/0380289 | A1* | 12/2014 | Kalogeropulos | G06F 8/443 |
| | | | | 717/152 |
| 2015/0089575 | A1* | 3/2015 | Vepa | G06F 21/62 |
| | | | | 726/1 |
| 2015/0106823 | A1* | 4/2015 | Canoy | G06F 9/505 |
| | | | | 718/105 |
| 2015/0256631 | A1* | 9/2015 | Gordon | H04L 67/18 |
| | | | | 701/532 |
| 2016/0019037 | A1* | 1/2016 | Varga | G06F 8/443 |
| | | | | 717/151 |
| 2016/0239279 | A1* | 8/2016 | Goetz | G06F 8/54 |
| 2016/0378443 | A1* | 12/2016 | Sun | G06F 8/41 |
| | | | | 717/140 |

\* cited by examiner

APPLICATION PROGRAM MANAGEMENT METHOD FOR MULTIPLE HARDWARE PLATFORMS

CROSS REFERENCE OF RELATED APPLICATION

This is a U.S. National Stage under 35 U.S.C. 371 of the International Application PCT/CN2016/087640, filed Jun. 29, 2016, which claims priority under 35 U.S.C. 119(a-d) to CN 201510389569.6, filed Jul. 6, 2015.

BACKGROUND OF THE PRESENT INVENTION

Field of Invention

The present invention relates to a technical field of application program installation and operation for computer operating systems, and more particularly to an application program management method for multiple hardware platforms.

Description of Related Arts

Computer operation is based on a variety of applications, and for most operating systems, users can download and install applications from software centers. However, Computer hardware platform is varied for different people. For example, CPUs (Central Processing Unit) from different manufacturers may support different CPU extension instruction sets, and CPUs from the same manufacturer may be different due to different production time and market positioning. In general, CPU of a new model will support new extension instruction sets which is not supported by CPU of an old model, and high-end CPU often supports more kinds of extension instruction sets than low-end CPU of the same period does. If software downloaded from the software center is not compiled with extension instruction sets which are only supported by the latest or higher-end CPU, then advantage of the CPU in supporting more extension instruction sets is in vain. If the software is compiled with extension instruction sets which are only supported by the latest or higher-end CPU, for being operated by CPU of the older model or the lower-end CPU, then the binary programs may have a larger volume and require more storage space, which also increases loading time of the program. In addition, there are currently a variety of computer hardware acceleration devices, such as graphics card and special accelerator card, so the prior art provides a common application software installation package which is difficult to take full advantage of different hardware platforms. Therefore, it is difficult to optimize the program for different hardware platforms. For some of the software, source codes are provided. Although users can compile their own way of installation so that the software will have a good performance on their machines, it is well known that compiling installation requires compiler environment, and installation configuration of the compiler environment are usually more complex, requiring full understand of the local computer hardware platform. Furthermore, compiling software is relatively time consuming and electricity consuming. Therefore, there is no doubt that these requirements bring difficulty and troubles to use, while many duplicated compiling work for the same platform also waste a lot of time and energy. So, a key technical problem to be solved is how to maximize adaptability of applications for different hardware platform structures, so as to optimize the applications on different hardware platforms.

In addition, temporary files are needed for installation and operation of a variety of applications used in computers. However, because of abnormal exit, execution error, power failure, system crash, negligence of software developers or other objects, a considerable number of temporary files cannot be removed promptly after use. Conventionally, the temporary files of a system will be more and more with the use of various software in the system, and these files occupy a lot of storage space which could be released. If the space occupied by the files is too large, it may affect the normal use of the system. At that time, users often need to spend some time and effort to do clean-up work to "junk files", or even reinstall the system. Sometimes, people will use the RAM as a virtual partition in which the temporary files are stored, because the RAM contents will be lost after power off. Thus, each time the computer starts, temporary files directory will be empty. But it will also bring some problems. For example, in many cases, the RAM space is a very valuable resource, so it would be improper to store temporary files in the RAM. In addition, some temporary files need to be used after a system restart, which must not be stored in the RAM. So, other key technical problems to be solved are how to reduce the space occupied by temporary files and how to properly clean up various temporary files during installation and operation of an application program.

SUMMARY OF THE PRESENT INVENTION

An object of the present invention is to provide an application program management method for multiple hardware platforms for solving the above-mentioned problems of the prior art, wherein the application program can better adapt to a hardware platform of each client computer, the application program runs with a high efficiency, the method is easy to implement, a cost is low, and compatibility with existing operating systems is sufficient.

Accordingly, in order to accomplish the above object, the present invention provides an application program management method for multiple hardware platforms, comprising steps of:

1) compiling a target application program into a plurality of versions for supporting different hardware platforms in advance; establishing a mapping relation between hardware platform types and corresponding application program versions, and specifying a generic application program version corresponding to each operating system type;

2) when a client computer requires the target application program, requiring a client computer hardware platform type and then searching a mapping relation between the client computer hardware platform type and a corresponding application program version thereof; requiring the corresponding application program version of the client computer hardware platform type if the corresponding application program version is found, or requiring the generic application program version for the client operating system type if the corresponding application program version is not found; and 3) managing a required application program version by the client computer.

Preferably, in the step 1), the hardware platform types comprises types for different GPU (Graphics Processing Unit) acceleration, types for different PPU (Physics Processing Units), types for different CPU (Central Processing Unit) extension instruction sets, and types for different APU (Accelerated Processing Unit).

Preferably, in the step 1), establishing the mapping relation between the hardware platform types and the corresponding application program versions and specifying the generic application program version corresponding to each operating system type specifically comprise determining the mapping relation between the hardware platform types and the corresponding application program versions according to naming rules or mapping table files of the hardware platform types.

Preferably, in the step 1), compiling the target application program into a plurality of the versions for supporting the different hardware platforms in advance further comprises storing the versions on a server; in the step 2), requiring the corresponding application program version of the client computer hardware platform type specifically comprising downloading the corresponding application program version of the client computer hardware platform type from the server; in the step 2), requiring the generic application program version for the client operating system type specifically comprises downloading the generic application program version for the client operating system type from the server.

Preferably, in the step 1), compiling the target application program into a plurality of the versions for supporting the different hardware platforms in advance further comprises storing the versions on a storage medium; in the step 2), requiring the corresponding application program version of the client computer hardware platform type specifically comprising loading the corresponding application program version of the client computer hardware platform type from the storage medium; in the step 2), requiring the generic application program version for the client operating system type specifically comprises loading the generic application program version for the client operating system type from the storage medium.

Preferably, the step 3) specifically comprises steps of:

3.1) creating a to-be-deleted-next-time temporary file directory and one or more not-to-be-deleted-next-time temporary file directories during starting of the operating system of the client computer, so as to store temporary files needed for application program installation and operation;

3.2) installing, uncompressing or operating the required application program version, and storing temporary files needed for installing, uncompressing or operating in the to-be-deleted-next-time temporary file directory or a predetermined one of the not-to-be-deleted-next-time temporary file directories; and 3.3) judging whether a trigger condition of temporary file directory switching is satisfied; if so, deleting the to-be-deleted-next-time temporary file directory, renaming the pre-determined one of the not-to-be-deleted-next-time temporary file directories with a name of the to-be-deleted-next-time temporary file directory, so as to convert the pre-determined one of the not-to-be-deleted-next-time temporary file directories into a new to-be-deleted-next-time temporary file directory; and creating a new not-to-be-deleted-next-time temporary file directory.

Preferably, in the step 3.3), the trigger condition is that the operating system is started, a pre-determined application program is started, the to-be-deleted-next-time temporary file directory exists for a pre-determined period, a pre-determined time is reached, or a coercion switching order is sent by a user.

Preferably, in the step 3.1), the not-to-be-deleted-next-time temporary file directories established are consecutively numbered; in the step 3.3), the pre-determined one of the not-to-be-deleted-next-time temporary file directories is a first one of the not-to-be-deleted-next-time temporary file directories which are consecutively numbered, wherein after renaming the pre-determined one of the not-to-be-deleted-next-time temporary file directories with the name of the to-be-deleted-next-time temporary file directory, subsequent not-to-be-deleted-next-time temporary file directories are renamed with names of previous not-to-be-deleted-next-time temporary file directories in sequence; in the step 3.3), creating the new not-to-be-deleted-next-time temporary file directory specifically comprises creating a last not-to-be-deleted-next-time temporary file directory for the not-to-be-deleted-next-time temporary file directories which are consecutively numbered.

According to the present invention, the application program management method for the multiple hardware platforms has the following advantages:

1: According to the present invention, the method comprises compiling a target application program into a plurality of versions for supporting different hardware platforms in advance; establishing a mapping relation between hardware platform types and corresponding application program versions, and specifying a generic application program version corresponding to each operating system type; when an operating system of a client computer requires the target application program, requiring a client computer hardware platform type and then searching a mapping relation between the client computer hardware platform type and a corresponding application program version thereof; requiring the corresponding application program version of the client computer hardware platform type if the corresponding application program version is found, or requiring the generic application program version for the client operating system type if the corresponding application program version is not found. As a result, the application program can better adapt to a hardware platform of each client computer, the application program runs with a high efficiency, the method is easy to implement, a cost is low, and compatibility with existing operating systems is sufficient.

2: The present invention further comprises creating a to-be-deleted-next-time temporary file directory and one or more not-to-be-deleted-next-time temporary file directories, and storing temporary files needed for installing, uncompressing or operating in the to-be-deleted-next-time temporary file directory or a predetermined one of the not-to-be-deleted-next-time temporary file directories; and judging whether a trigger condition of temporary file directory switching is satisfied; if so, deleting the to-be-deleted-next-time temporary file directory, renaming the pre-determined one of the not-to-be-deleted-next-time temporary file directories with a name of the to-be-deleted-next-time temporary file directory, so as to convert the pre-determined one of the not-to-be-deleted-next-time temporary file directories into a new to-be-deleted-next-time temporary file directory; and creating a new not-to-be-deleted-next-time temporary file directory. Based on switching between the to-be-deleted-next-time temporary file directory and one or more not-to-be-deleted-next-time temporary file directories, it is possible timely delete temporary files caused by program abnormal exit, execution error, power failure, system crash, negligence of software developers or other objects (such as malware), in such a manner that the client computer has a good performance and sufficient available storage space during operation. Furthermore, it prevents malicious software from continuously living in the temporary file directory and thereby running.

DETAILED DESCRIPTION OF THE PREFERRED EMBODIMENT

Figure 1:
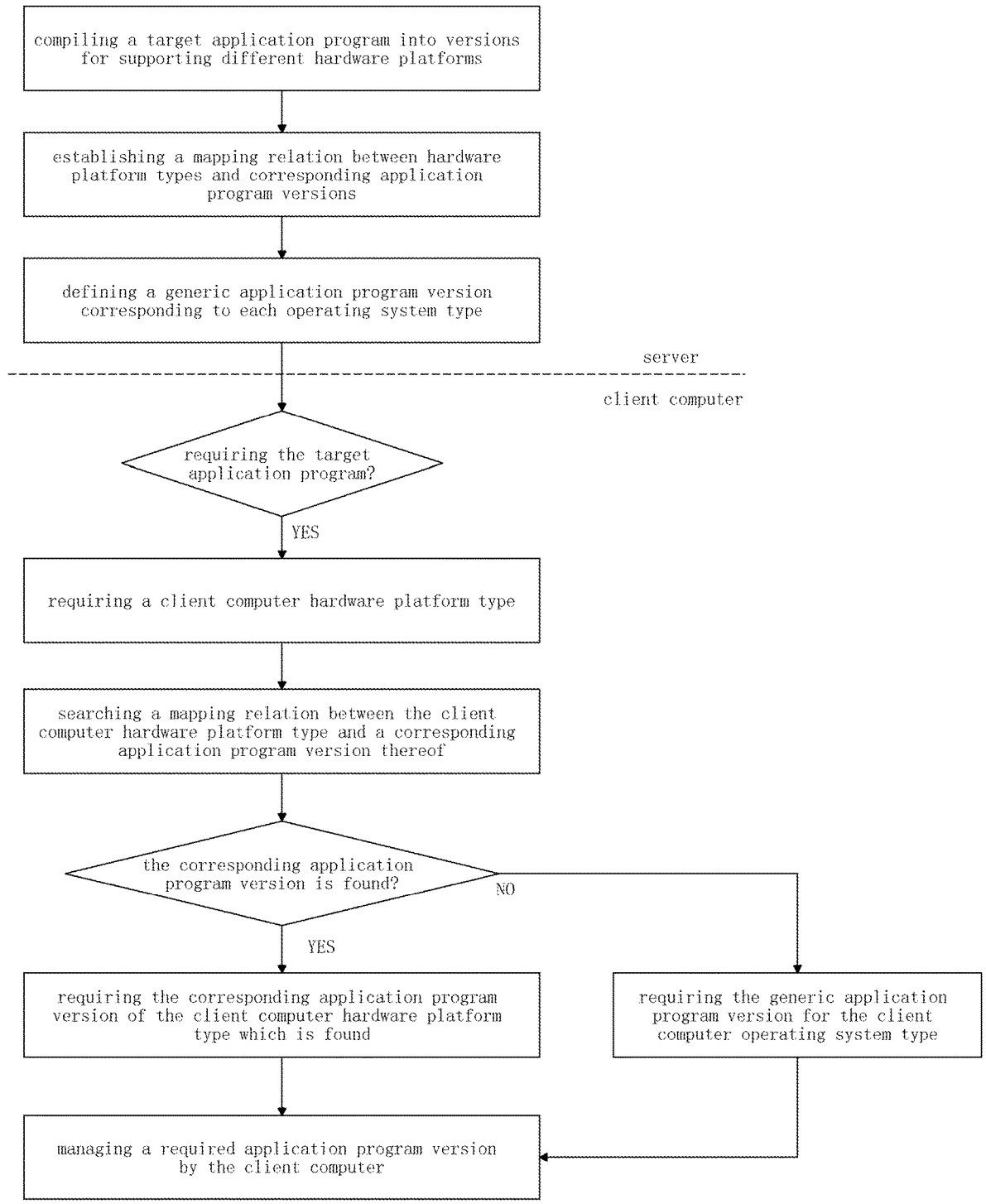
FIG. 1 is a basic flow chart of a method according to a preferred embodiment of the present invention.

Referring to FIG. 1, an application program management method for multiple hardware platforms according to a preferred embodiment comprises steps of:

1) compiling a target application program into a plurality of versions for supporting different hardware platforms in advance; establishing a mapping relation between hardware platform types and corresponding application program versions, and specifying a generic application program version corresponding to each operating system type;

2) when a client computer requires the target application program, requiring a client computer hardware platform type and then searching a mapping relation between the client computer hardware platform type and a corresponding application program version thereof; requiring the corresponding application program version of the client computer hardware platform type if the corresponding application program version is found, or requiring the generic application program version for a client operating system type if the corresponding application program version is not found; and 3) managing a required application program version by the client computer.

According to the preferred embodiment, in the step 1), the hardware platform types comprises types for different GPU acceleration, types for different physics processing units, types for different CPU extension instruction sets, and types for different APUs. For example, the types for different CPU extension instruction sets comprise: (1) types supporting both SSE4 and AVX; (2) types supporting SSE4 but not AVX; and (3) types supporting neither SSE4 nor AVX. Types not supporting SSE4 but AVX are not considered because CPU supporting AVX usually also supports SSE4. For the hardware platform types for different CPU extension instruction sets, when compiling a target application program into a plurality of versions for supporting a plurality of hardware platforms as described in the step 1), the target application program is compiled into versions corresponding to the hardware platform types for different CPU extension instruction sets by controlling relative parameters when compiling.

According to the preferred embodiment, in the step 1), establishing the mapping relation between the hardware platform types and the corresponding application program versions and specifying the generic application program version corresponding to each operating system type specifically comprise determining the mapping relation between the hardware platform types and the corresponding application program versions according to naming rules of the hardware platform types. There is no doubt that the mapping relation between the hardware platform types and the corresponding application program versions can also be determined according to mapping table files (such as in files or other types of configuration files, database files, registry, etc.).

According to the preferred embodiment, in the step 1), compiling the target application program into a plurality of the versions for supporting the different hardware platforms in advance further comprises storing the versions on a server; in the step 2), requiring the corresponding application program version of the client computer hardware platform type specifically comprising downloading the corresponding application program version of the client computer hardware platform type from the server; in the step 2), requiring the generic application program version for the client operating system type specifically comprises downloading the generic application program version for the client operating system type from the server. According to the preferred embodiment, when requiring the corresponding application program version in the step 2), an operating main body is a software center of the client computer, which may also be services or programs of other types.

Figure 2:
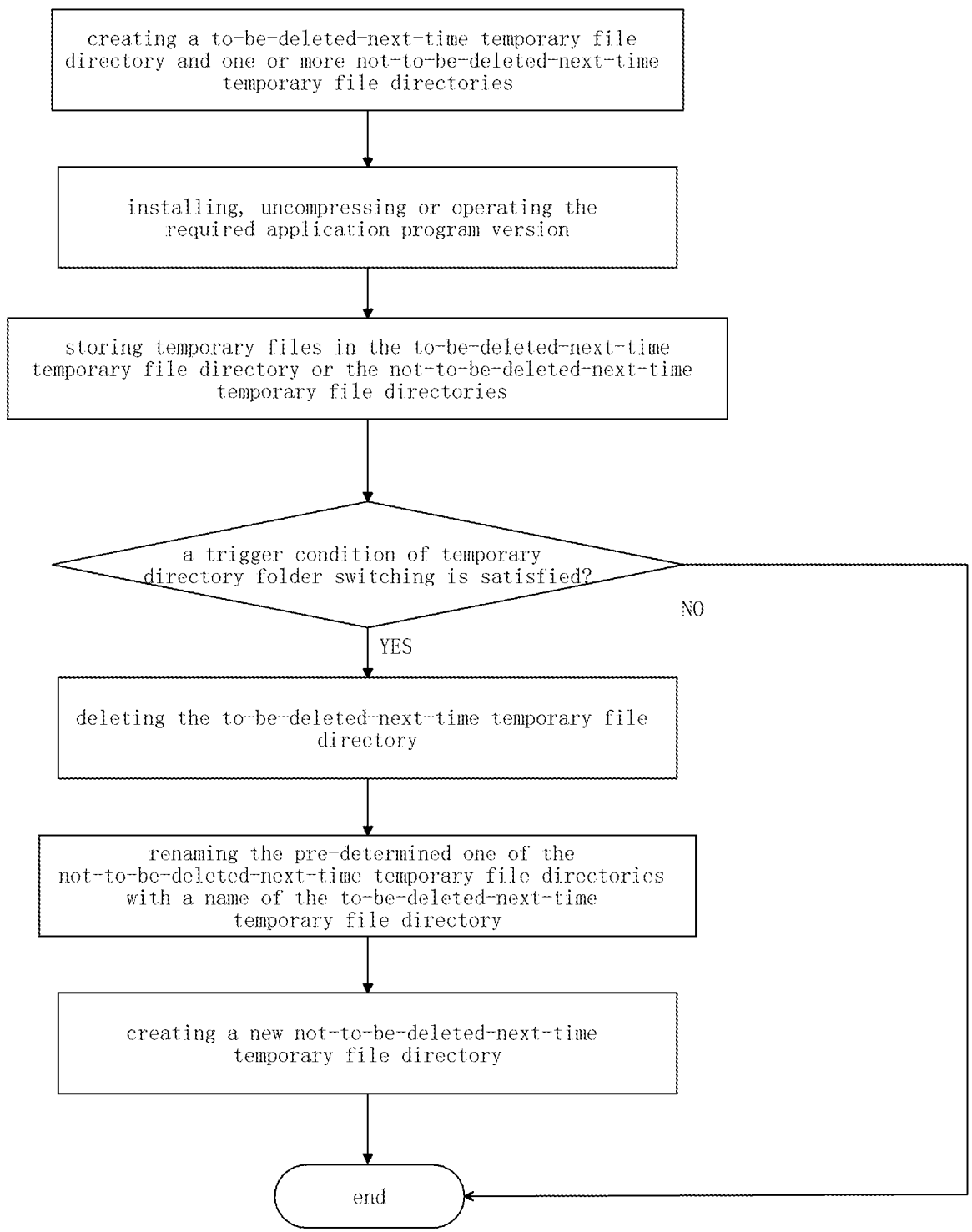
FIG. 2 is a basic flow chart of a step 3) of the method according to the preferred embodiment of the present invention.

Referring to FIG. 2, the step 3) specifically comprises steps of:

3.1) creating a to-be-deleted-next-time temporary file directory and one or more not-to-be-deleted-next-time temporary file directories during starting of the operating system of the client computer, so as to store temporary files needed for application program installation and operation; according to the preferred embodiment, the to-be-deleted-next-time temporary file directory is "/hddtmp/0/", and the not-to-be-deleted-next-time temporary file directories are "/hddtmp/1/"-"/hddtmp/5/"; there is no doubt that a number of the not-to-be-deleted-next-time temporary file directories can be one;

3.2) installing, uncompressing or operating the required application program version, and storing temporary files needed for installing, uncompressing or operating in the to-be-deleted-next-time temporary file directory "/hddtmp/0/" or a predetermined one of the not-to-be-deleted-next-time temporary file directories (one of "/hddtmp/1/"-"/hddtmp/5/"); and 3.3) judging whether a trigger condition of temporary file directory switching is satisfied; if so, deleting the to-be-deleted-next-time temporary file directory "/hddtmp/0/", renaming the pre-determined one of the not-to-be-deleted-next-time temporary file directories with a name of the to-be-deleted-next-time temporary file directory "/hddtmp/0/", so as to convert the pre-determined one of the not-to-be-deleted-next-time temporary file directories into a new to-be-deleted-next-time temporary file directory; and creating a new not-to-be-deleted-next-time temporary file directory; according to the present invention, the pre-determined one of the not-to-be-deleted-next-time temporary file directories is "/hddtmp/1/", which can be another one of the not-to-be-deleted-next-time temporary file directories according to requirements.

According to the preferred embodiment, based on switching between the to-be-deleted-next-time temporary file directory and one or more not-to-be-deleted-next-time temporary file directories, it is possible timely delete temporary files caused by program abnormal exit, execution error, power failure, system crash, negligence of software developers or other objects (such as malware), in such a manner that the client computer has a good performance and sufficient available storage space during operation. Furthermore, it prevents malicious software from continuously living in the temporary file directory and thereby running.

According to the preferred embodiment, in the step 3.3), the trigger condition is that the operating system is started, which ensures switching the temporary file directories before the application program is started, so as to prevent switching failure because the application program occupies the to-be-deleted-next-time temporary file directory or the not-to-be-deleted-next-time temporary file directories, leading to better reliability. In addition, the trigger condition may also be a pre-determined application program (such as the software center or a certain application program) is started, the to-be-deleted-next-time temporary file directory exists for a pre-determined period, a pre-determined time is reached, a coercion switching order is sent by a user, etc.

For conventional application programs, temporary files are generally stored in a certain directory. For an application program, if the temporary files are directly deleted, then important temporary files will be lost, leading to irreparable loss. If the temporary files are not deleted, then the temporary files unnecessarily occupy storage space, resulting in a waste of computer resources and slowing down the operating system. According to the preferred embodiment, in the step 3.1), the not-to-be-deleted-next-time temporary file directories established are consecutively numbered; in the step 3.3), the pre-determined one of the not-to-be-deleted-next-time temporary file directories is a first one of the not-to-be-deleted-next-time temporary file directories which are consecutively numbered, wherein after renaming the pre-determined one of the not-to-be-deleted-next-time temporary file directories with the name of the to-be-deleted-next-time temporary file directory, subsequent not-to-be-deleted-next-time temporary file directories are renamed with names of previous not-to-be-deleted-next-time temporary file directories in sequence; in the step 3.3), creating the new not-to-be-deleted-next-time temporary file directory specifically comprises creating a last not-to-be-deleted-next-time temporary file directory for the not-to-be-deleted-next-time temporary file directories which are consecutively numbered. For example, in the preferred embodiment, the "/hddtmp/1/" is renamed as "/hddtmp/0/", then the "/hddtmp/2/" is renamed as "/hddtmp/1/", the "/hddtmp/3/" is renamed as "/hddtmp/2/", the "/hddtmp/4/" is renamed as "/hddtmp/3/", the "/hddtmp/5/" is renamed as "/hddtmp/4/", and finally a new "/hddtmp/5/" is established. With the above rules, storage rules of the temporary files of each application program are simple and clear without extra directory mapping. For example, the temporary files of a certain application program are stored in "/hddtmp/3/", then the temporary files will be in the "/hddtmp/2/" if the trigger condition of temporary file directory switching is satisfied and temporary file directory switching is executed. At the moment, the application program will automatically load the temporary files from "/hddtmp/2/". On one side, the temporary files of the application program will be rolling in "/hddtmp/5/"-"/hddtmp/1/" instead of directly deleted, which provides a few chances (5 chances according to the preferred embodiment) to users for recovering important temporary files, preventing irreparable loss. On the other hand, the temporary files will be rolling in "/hddtmp/5/"-"/hddtmp/1/" before finally being deleted, so as to effectively prevent the temporary files from unnecessarily occupying the storage space, reduce computing resource consuming, and ensure high performance of the operating system.

One skilled in the art will understand that the embodiment of the present invention as shown in the drawings and described above is exemplary only and not intended to be limiting. Therefore, this invention includes all modifications encompassed within the spirit and scope of the following claims.

What is claimed is:

1. An application program management method for multiple hardware platforms, comprising the steps of:
   1) compiling a target application program into a plurality of application program versions for supporting different hardware platform types, establishing a mapping relation between the different hardware platform types and the plurality of application program versions, and specifying a generic application program version corresponding to multiple operating system types;
   2) when a client computer requires the target application program, determining the client computer hardware platform type and then searching the mapping relation for the determined client computer hardware platform type and a corresponding application program version and acquiring the corresponding application program version of the client computer hardware platform type if the corresponding application program version is found, or acquiring the generic application program version for the client computer if the corresponding application program version is not found; and
   3) managing the acquired application program version or the acquired generic application program version by the client computer, wherein the managing comprises:
   judging whether a trigger condition of temporary file folder switching is satisfied, and if so, renaming a predetermined not-to-be-deleted-next-time file directory with a name of a to-be-deleted-next-time temporary file directory, deleting the to-be-deleted-next-time temporary file directory, and creating a new not-to-be-deleted-next-time file directory, wherein the trigger condition is that the to-be-deleted-next-time temporary file directory exists for a pre-determined period.

2. The application program management method, as recited in claim 1, wherein in the step 1), the different hardware platform types comprise types for different GPU (Graphics Processing Unit) accelerations, types for different PPUs (Physics Processing Units), types for different CPU (Central Processing Unit) extension instruction sets, and types for different APUs (Accelerated Processing Unit).

3. The application program management method, as recited in claim 2, wherein in the step 1), establishing the mapping relation between the different hardware platform types and the plurality of application program versions and specifying the generic application program version corresponding to the multiple operating system types comprises determining the mapping relation between the different hardware platform types and the corresponding plurality of application program versions according to naming rules or mapping table files of the different hardware platform types.

4. The application program management method, as recited in claim 3, wherein
   in the step 1), compiling the target application program into the plurality of the application program versions for supporting the different hardware platform types further comprises storing the plurality of application program versions on a server;
   in the step 2), acquiring the corresponding application program version of the client computer hardware platform type specifically comprises downloading the corresponding application program version of the client computer hardware platform type from the server; and
   in the step 2), acquiring the generic application program version for the multiple client operating system types specifically comprises downloading the generic application program version for the client operating system type from the server.

5. The application program management method, as recited in claim 4, wherein the step 3) further comprises the steps of:
   creating the to-be-deleted-next-time temporary file directory and the plurality of not-to-be-deleted-next-time file directories during starting of the operating system of the client computer, so as to store temporary files needed for application program installation and operation; and installing, uncompressing or operating the acquired application program version, and storing temporary files needed for the installing, uncompressing or operating in the to-be-deleted-next-time temporary file directory or the predetermined one of the not-to-be-deleted-next-time file directories.

6. The application program management method, as recited in claim 5, wherein the trigger condition is further that the operating system is started, a pre-determined application program is started, a pre-determined time is reached, or a coercion switching order is sent by a user.

7. The application program management method, as recited in claim 6, wherein
the not-to-be-deleted-next-time content directories established are consecutively numbered;
the pre-determined one of the not-to-be-deleted-next-time content directories is a first one of the not-to-be-deleted-next-time content directories, wherein after renaming the pre-determined one of the not-to-be-deleted-next-time content directories with the name of the to-be-deleted-next-time temporary file directory, subsequent not-to-be-deleted-next-time content directories are renamed with names of previous not-to-be-deleted-next-time content directories in sequence; and
creating the new not-to-be-deleted-next-time file directory further comprises establishing the new not-to-be-deleted-next-time file directory as a last not-to-be-deleted-next-time file directory for the plurality of not-to-be-deleted-next-time file directories.

8. The application program management method, as recited in claim 3, wherein
in the step 1), compiling the target application program into the plurality of the application program versions for supporting the different hardware platform types further comprises storing the plurality of application program versions on a storage medium;
in the step 2), acquiring the corresponding application program version of the client computer hardware platform type specifically comprises loading the corresponding application program version of the client computer hardware platform type from the storage medium; and
in the step 2), acquiring the generic application program version for the multiple client operating system types specifically comprises loading the generic application program version for the client operating system type from the storage medium.

9. The application program management method, as recited in claim 8, wherein the step 3) further comprises the steps of:
creating the to-be-deleted-next-time temporary file directory and the plurality of not-to-be-deleted-next-time file directories during starting of the operating system of the client computer, so as to store temporary files needed for application program installation and operation; and
installing, uncompressing or operating the acquired application program version, and storing temporary files needed for the installing, uncompressing or operating in the to-be-deleted-next-time temporary file directory or the predetermined one of the not-to-be-deleted-next-time file directories.

10. The application program management method, as recited in claim 9, wherein the trigger condition is further that the operating system is started, a pre-determined application program is started, a pre-determined time is reached, or a coercion switching order is sent by a user.

11. The application program management method, as recited in claim 10, wherein
the not-to-be-deleted-next-time content directories established are consecutively numbered;
the pre-determined one of the not-to-be-deleted-next-time content directories is a first one of the not-to-be-deleted-next-time content directories, wherein after renaming the pre-determined one of the not-to-be-deleted-next-time content directories with the name of the to-be-deleted-next-time temporary file directory, subsequent not-to-be-deleted-next-time content directories are renamed with names of previous not-to-be-deleted-next-time content directories in sequence; and
creating the new not-to-be-deleted-next-time file directory further comprises establishing the new not-to-be-deleted-next-time file directory as a last not-to-be-deleted-next-time file directory for the plurality of not-to-be-deleted-next-time file directories.

12. The application program management method, as recited in claim 3, wherein the step 3) further comprises the steps of:
creating the to-be-deleted-next-time temporary file directory and the plurality of not-to-be-deleted-next-time file directories during starting of the operating system of the client computer, so as to store temporary files needed for application program installation and operation; and
installing, uncompressing or operating the acquired application program version, and storing temporary files needed for the installing, uncompressing or operating in the to-be-deleted-next-time temporary file directory or the predetermined one of the not-to-be-deleted-next-time file directories.

13. The application program management method, as recited in claim 12, wherein the trigger condition is further that the operating system is started, a pre-determined application program is started, a pre-determined time s reached, or a coercion switching order is sent by a user.

14. The application program management method, as recited in claim 13, wherein
the not-to-be-deleted-next-time content directories established are consecutively numbered;
the pre-determined one of the not-to-be-deleted-next-time content directories is a first one of the not-to-be-deleted-next-time content directories, wherein after renaming the pre-determined one of the not-to-be-deleted-next-time content directories with the name of the to-be-deleted-next-time temporary file directory, subsequent not-to-be-deleted-next-time content directories are renamed with names of previous not-to-be-deleted-next-time file content directories in sequence; and
creating the new not-to-be-deleted-next-time file directory further comprises establishing the new not-to-be-deleted-next-time file directory as a last not-to-be-deleted-next-time file directory for the plurality of not-to-be-deleted-next-time file directories.

15. The application program management method, as recited in claim 2, wherein the step 3) further comprises the steps of:
creating the to-be-deleted-next-time temporary file directory and the plurality of not-to-be-deleted-next-time file directories during starting of the operating system of the client computer, so as to store temporary files needed for application program installation and operation; and installing, uncompressing or operating the acquired application program version, and storing temporary files needed for the installing, uncompressing or operating in the to-be-deleted-next-time temporary file directory or the predetermined one of the not-to-be-deleted-next-time file directories.

16. The application program management method, as recited in claim 15, wherein the trigger condition is further that the operating system is started, a pre-determined application program is started, a pre-determined time is reached, or a coercion switching order is sent by a user.

17. The application program management method, as recited in claim 16, wherein
the not-to-be-deleted-next-time content directories established are consecutively numbered;
the pre-determined one of the not-to-be-deleted-next-time content directories is a first one of the not-to-be-deleted-next-time content directories, wherein after renaming the pre-determined one of the not-to-be-deleted-next-time content directories with the name of the to-be-deleted-next-time temporary file directory, subsequent not-to-be-deleted-next-time content directories are renamed with names of previous not-to-be-deleted-next-time content directories in sequence; and
creating the new not-to-be-deleted-next-time file directory further comprises establishing the new not-to-be-deleted-next-time file directory as a last not-to-be-deleted-next-time file directory for the plurality of not-to-be-deleted-next-time file directories.

18. The application program management method, as recited in claim 1, wherein the step 3) further comprises the steps of:
creating the to-be-deleted-next-time temporary file directory and the plurality of not-to-be-deleted-next-time file directories during starting of the operating system of the client computer, so as to store temporary files needed for application program installation and operation; and
installing, uncompressing or operating the acquired application program version, and storing temporary files needed for the installing, uncompressing or operating in the to-be-deleted-next-time temporary file directory or the predetermined one of the not-to-be-deleted-next-time file directories.

19. The application program management method, as recited in claim 18, wherein the trigger condition is further that the operating system is started, a pre-determined application program is started, a pre-determined time is reached, or a coercion switching order is sent by a user.

20. The application program management method, as recited in claim 19, wherein
the not-to-be-deleted-next-time content directories established are consecutively numbered;
the pre-determined one of the not-to-be-deleted-next-time content directories is a first one of the not-to-be-deleted-next-time content directories, wherein after renaming the pre-determined one of the not-to-be-deleted-next-time content directories with the name of the to-be-deleted-next-time temporary file directory, subsequent not-to-be-deleted-next-time content directories are renamed with names of previous not-to-be-deleted-next-time content directories in sequence; and
creating the new not-to-be-deleted-next-time file directory further comprises establishing the new not-to-be-deleted-next-time file directory as a last not-to-be-deleted-next-time file directory for the plurality of not-to-be-deleted-next-time file directories.

* * * * *